United States Patent
Demulder

(10) Patent No.: US 9,807,941 B2
(45) Date of Patent: Nov. 7, 2017

(54) TUCKER FINGER OVER-CENTER PROTECTION

(71) Applicant: Deere & Company, Moline, IL (US)

(72) Inventor: Carl F. Demulder, Ottumwa, IA (US)

(73) Assignee: Deere & Company, Moline, IL (US)

( * ) Notice: Subject to any disclaimer, the term of this patent is extended or adjusted under 35 U.S.C. 154(b) by 733 days.

(21) Appl. No.: 14/261,996

(22) Filed: Apr. 25, 2014

(65) Prior Publication Data

US 2015/0305246 A1   Oct. 29, 2015

(51) Int. Cl.
*A01F 15/14* (2006.01)

(52) U.S. Cl.
CPC .................... *A01F 15/145* (2013.01)

(58) Field of Classification Search
CPC ........ A01F 15/07; A01F 15/14; A01F 15/145; A01F 2015/143; B65B 27/12; F16B 37/14
USPC ............. 100/19 R, 20, 24, 33 R; 289/10, 16; 56/433, 435, 439, 441, 442, 444, 445
See application file for complete search history.

(56) References Cited

U.S. PATENT DOCUMENTS

| | | | |
|---|---|---|---|
| 2,872,860 A * | 2/1959 | Smith .................... | A01F 15/145 100/22 |
| 2,926,599 A * | 3/1960 | McClellan ............ | A01F 15/145 100/22 |
| 4,108,062 A | 8/1978 | White | |
| 4,753,464 A * | 6/1988 | Jackson ................ | A01F 15/148 289/18.1 |
| 4,765,235 A | 8/1988 | Schrag et al. | |
| 8,495,956 B1 | 7/2013 | Demulder et al. | |
| 8,671,834 B1 | 3/2014 | Rotole et al. | |
| 2014/0116273 A1 | 5/2014 | Demulder | |

OTHER PUBLICATIONS

European Search Report issued in counterpart application No. 15164058.8, dated Aug. 26, 2015 (4 pages).
Office Action from European Patent Office in counterpart European Application No. 15164058.8 dated Jan. 20, 2017 (4 pages).

* cited by examiner

*Primary Examiner* — Jimmy T Nguyen

(57) ABSTRACT

A knotter table of a baler includes a plurality of tucker finger assemblies which each aid in tying together ends of a set of twine strands so as to tie a loop of twine about a bale formed in a baling chamber. Each tucker finger assembly includes a tucker finger defined by a plate pivotally mounted alongside a baling chamber needle slot for being pivoted horizontally between a standby position, wherein the tucker finger is entirely to one side of the needle slot, and a working position, wherein the tucker finger is pivoted across the needle slot. A stop arrangement is provided for being engaged by the tucker finger or by an operating linkage coupled to the tucker finger in the event that the tucker finger pivots a preselected distance beyond a desired working range so as to prevent the operating linkage from going over-center and causing linkage damage.

7 Claims, 7 Drawing Sheets

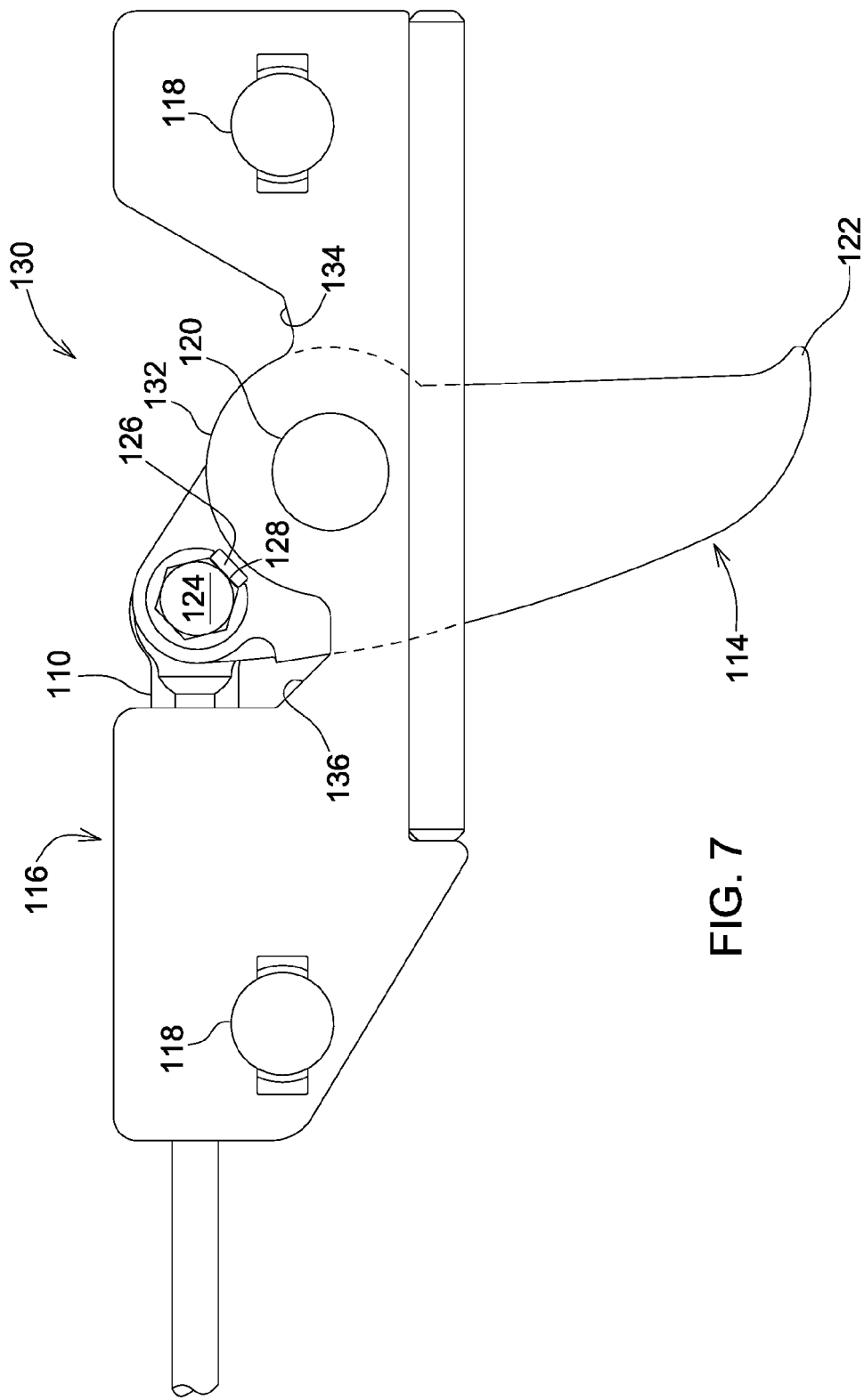

TUCKER FINGER OVER-CENTER PROTECTION

FIELD OF THE INVENTION

The present invention relates to square balers and more particularly relates to tucker finger arrangements associated with twine knotter assemblies for tying loops of twine about a bale of crop material formed in the baling chamber of such balers.

BACKGROUND OF THE INVENTION

Balers for producing parallelepiped bales in their baling chambers, so-called square balers, are equipped with knotter tables including a plurality of knotter assemblies for respectively tying a plurality of twine loops about finished bales formed in bale chambers of the balers. Associated with each knotter assembly for aiding in the tying function is a tucker or twine finger mounted as part of the knotter table to the top of the baling chamber so as to be adjacent to a longitudinally extending slot provided for permitting a twine-carrying needle to pass through the slot and deliver twine to an associated knotter assembly during a tying cycle. Each tucker finger is mounted for pivoting between a standby position located to one side of the slot and a working position extending across the slot.

The tucker fingers of a given baler are simultaneously driven in timed relationship to the knotter assemblies by means of respective length-adjustable motion transfer links connected between crank arms that are fixed along the length of a transverse tucker finger control shaft to which oscillating motion is imparted in a timed relationship to the knotter function of the baler by an arm carrying a cam follower roller engaged with a tucker finger control cam plate, mounted for rotating together with a transverse knotter gear drive shaft.

In order for each tucker finger to operate properly, it is adjusted to its standby position by adjusting the length of the tucker finger motion transfer link when the cam follower roller is in contact with an inner radius of the cam plate. Because this setting of the tucker finger is not straight forward, errors in adjusting the tucker finger have occurred because the cam follower roller is engaged with a cam radius greater than the inner most radius, this misadjustment resulting in the associated tucker finger motion transfer link traveling over-center during a tying cycle and consequently resulting in damage to the linkage components.

What is needed then is a solution which will permit errors in adjusting a tucker finger while avoiding damage due to such adjustment errors.

SUMMARY OF THE INVENTION

According to the present invention, there is provided an improved tucker finger assembly.

An object of the invention is to provide a tucker finger assembly constructed so as to permit errors in adjusting a given tucker finger while avoiding damage resulting from the adjustment error.

The above object is achieved by a tucker finger assembly which employs a hard stop preventing the tucker finger from pivoting sufficiently for its associated motion transfer link to go over-center. One embodiment disclosed for achieving this object is to provide each tucker finger assembly with a tucker finger base plate mounted to a horizontal floor region of the knotter table that overlays a top wall of the baling chamber such that the base plate extends alongside a longitudinal needle slot, with a tucker finger being pivotally mounted to the base plate for pivoting through a predetermined range of movement between a standby position completely to one side of the slot and a working position crosswise to the slot, and to provide a cut out region in the base plate for providing clearance for arcuate travel of the head of a bolt coupling the motion transfer link to the tucker finger, with at least one end of the cut-out region being defined by a stop surface located so as to be engaged by the bolt head in the event that the tucker finger rotates a predetermined minimal amount beyond said predetermined range of movement so as to prevent the motion transfer link from going over-center.

BRIEF DESCRIPTION OF THE DRAWINGS

FIG. 7 is a bottom view of the base plate and tucker finger shown in FIG. 4 including the coupling of the tucker finger with the motion transfer link and showing the cast feature of the tucker finger for orienting the hex head of the coupling bolt.

DESCRIPTION OF THE PREFERRED EMBODIMENT

Preliminarily, it is to be noted that the terms "right" and "left" are in accordance with an observer standing behind and facing in a forward direction of travel of a baler equipped with a tying table constructed in accordance with the present invention.

Figure 1:
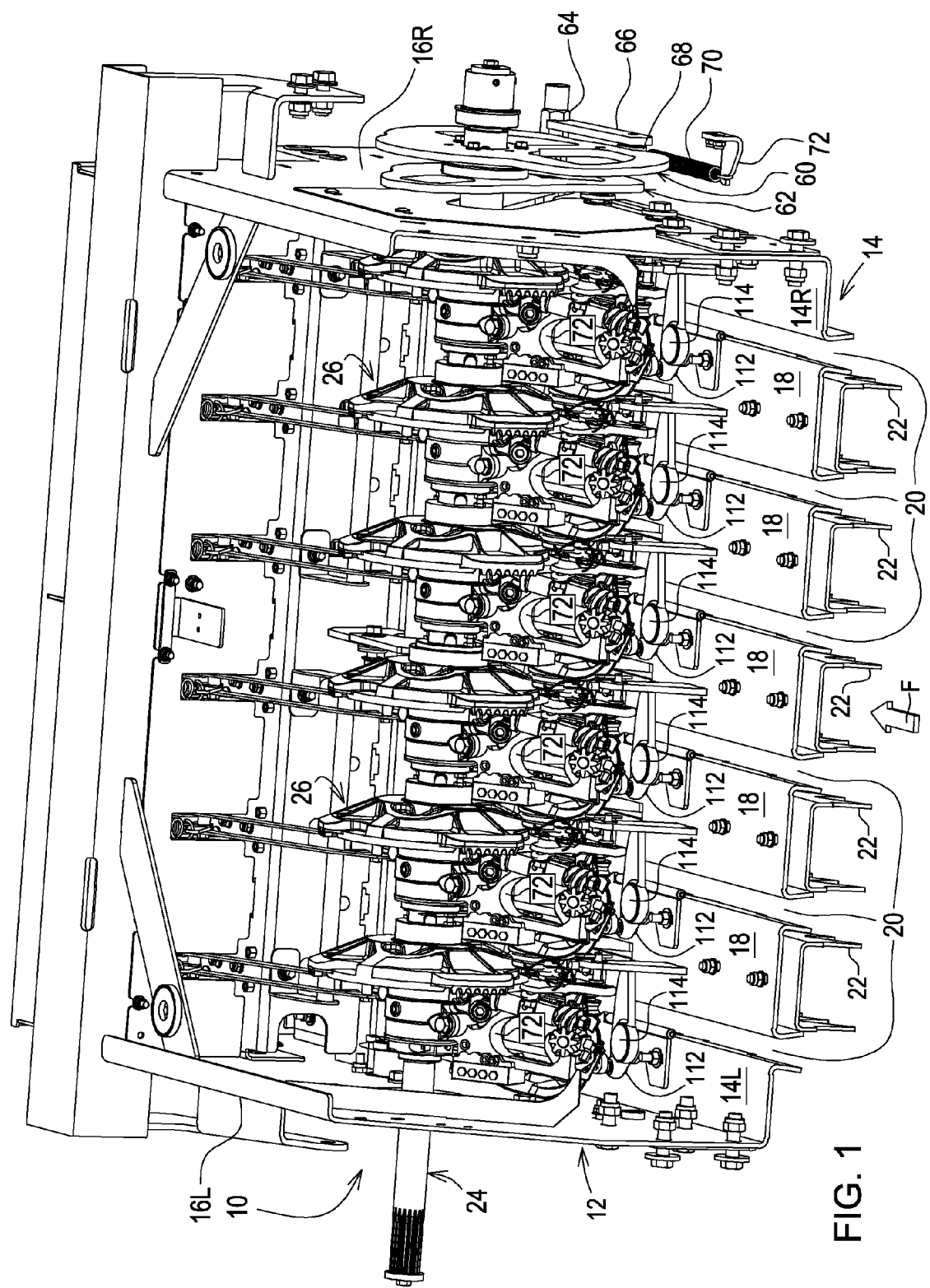
FIG. 1 is a right rear perspective view of a portion of the knotter table embodying tucker finger assemblies constructed in accordance with the present invention.

Referring now to FIG. 1, there is shown a knotter table 10 for use with a large square baler having a forward direction of travel as indicated by an arrow F. The knotter table 10 includes a support frame 12 comprising a bottom wall or floor 14 including L-shaped right- and left-hand bottom wall segments 14R and 14L respectively being formed by inwardly bent, L-shaped portions of right- and left-hand side walls 16R and 16L. The bottom wall further includes a plurality central bottom wall segments 18 comprising downwardly opening, longitudinally extending channel members that are spaced transversely from each other and from the short legs of the wall segments 14R and 14L to define a plurality of longitudinal needle slots 20 for respectively permitting a like number of twine-carrying needles (not shown) to swing upwardly through them during a tying cycle for securing a plurality of sets of twine strands together to form loops of twine about a bale formed in a baling chamber having a rear top region including a plurality of channel members 22 located within and supporting the knotter table bottom wall segments 18.

A central component of the knotter table 10 is a knotter gear drive shaft 24 extending transversely to the direction of travel of the baler. Opposite end regions of the drive shaft 24 are respectively supported in bearing assemblies (not shown) including right and left bearing housings respectively mounted to the right and left vertical side walls 16R and 16L. Six identical knotter assemblies 26 are mounted at equally spaced locations across a middle region of the drive shaft 24.

Figure 2:
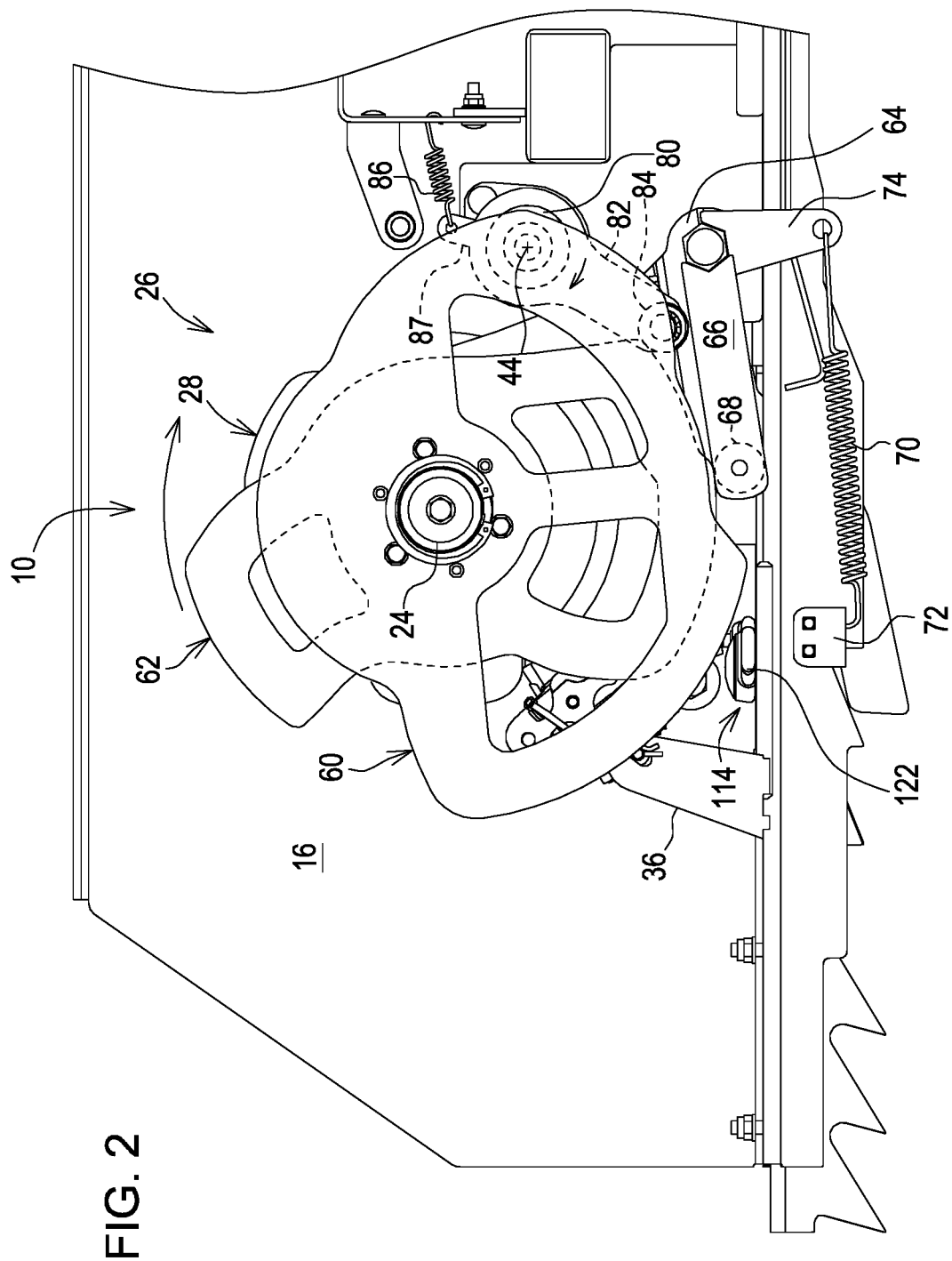
FIG. 2 is a right side view, with parts removed, of the knotter table shown in FIG. 1.
Figure 3:
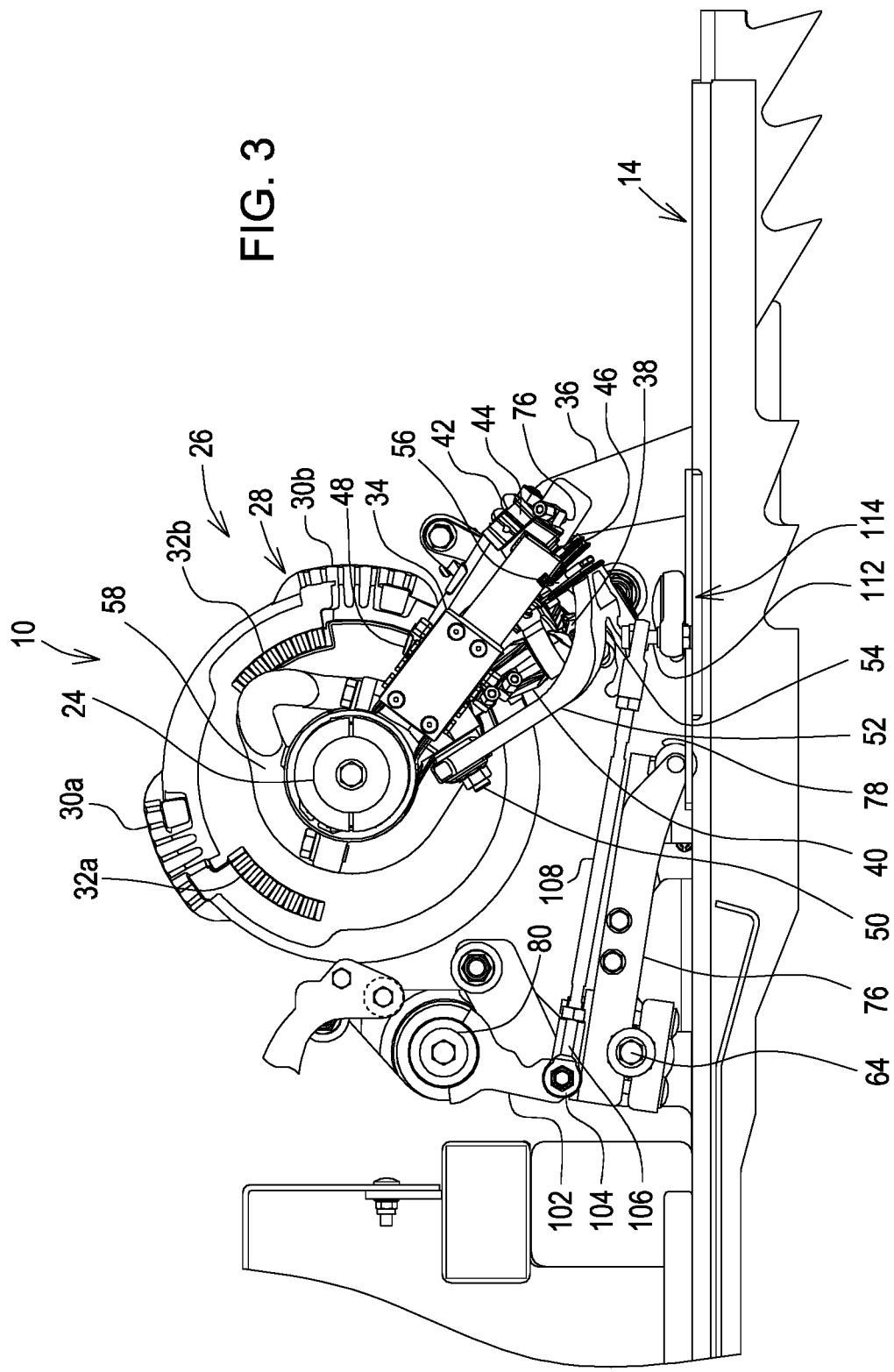
FIG. 3 is a left side view, with parts removed, of the knotter table shown in FIG. 1.

Referring now also to FIGS. 2 and 3, it can be seen that each knotter assembly 26 includes a generally circular drive gear 28 having an integral cylindrical hub received on, and keyed for rotation with, the shaft 24. A left face of each drive gear 64 is provided with a pair of radially outer, annularly spaced, axially projecting gear tooth segments 30a and 30b, respectively, and with a pair of radially inner, annularly spaced, axially projecting gear tooth segments 32a and 32b, respectively, the gear tooth segments having purposes explained below.

Each assembly 26 includes a knotter frame 34 having an upper end defined by a two-piece cylindrical sleeve received on a left end section of the gear hub so as to permit the hub to rotate relative to the knotter frame 34, the latter being anchored to the bottom wall or floor 14 of the knotter table through the agency of an upright anchor member 36 having a lower end fixed to an upper surface of an adjacent one of the bottom wall segments 18, with a lower end of the knotter frame 34 being pinned to an upper region of the anchor member 36. Each knotter frame 34 carries knot-forming components (see FIG. 3). A bill hook 38 is carried at the bottom of a bill hook spindle mounted in the knotter frame 34 for rotation about a first upwardly and forwardly inclined axis, a bevel gear 40 carried at the top of the spindle at a location for being driven by the outer gear tooth segments 30a and 30b of the knotter gear 28. A worm gear spindle is mounted to the frame 34 for rotation about a second upwardly and forwardly inclined axis and carries a worm gear 42 at its lower end meshed with a drive gear 44 coupled to an upper end of a twine holder spindle that is mounted in the frame 34 for rotation about a rearwardly and upwardly inclined third axis, the spindle having a multi-disc twine holder 46 secured to its lower end at a location behind and closely adjacent the bill hook 38, the twine holder acting for holding strands of twine in a position for engagement by the bill hook 38 during rotation of the latter. The upper end of the worm gear spindle carries a bevel gear 48 located for meshing with the inner gear tooth segments 32a and 32b of the knotter gear 28. Mounted to an upper front underside location of the knotter frame 34 for swinging about an upwardly and rearwardly extending pivot axis defined by a pivot bolt 50 is a downwardly and rearwardly extending knife arm 52 having a forked lower end defining a crotch 54 (FIG. 3) opening upwardly at a location just in front of the bill hook 38. A knife 56 is mounted to the arm 52 for sweeping a path extending between the bill hook 38 and the twine holder 46 for severing twine strands extending between the bill hook and twine holder when the knife arm 52 is pivoted transversely about the axis of bolt 50 at the proper time during the tying cycle. Such movement of the arm 52 to operate the knife 56 serves to engage the proximal areas of the crotch 54 with a knot formed on the bill hook 38 for stripping the knot off the bill hook. Swinging movement of the arm 52 at the proper time during the tying cycle is achieved by providing the arm 52 with an end portion (not visible) that extends transversely relative to the pivot axis defined by the pivot bolt 50 and carries a follower roller (not visible) which is received within a cam track 58 provided in the face of the knotter drive gear 28.

Successful tying of strands of twine together in order to form loops of twine about a finished bale requires precise timing between the presentation of twine strands to the bill hooks 38 and twine holders 46, with these strands being under proper tension. In order to accomplish this timing, a twine position control cam plate 60 is mounted on the knotter gear shaft 24 adjacent a right end thereof, and a tucker finger control cam plate 62 is mounted on the shaft 24 just axially inboard of the plate 60.

A twine position control shaft 64 is mounted forward of the cam plates 60 and 62 at an elevation just above the bottom wall or floor 14 of the knotter table frame 12, with opposite ends of the shaft 64 being rotatably mounted in bearings carried by bearing support plates (not shown). A cam follower arm 66 is joined to, and projects rearward from, a right end region of the control shaft 64 and carries a roller 68 engaged with a cam track defined by an outer edge of the cam plate 60. A coil tension spring 70 is tensioned between a support frame anchor point 72 and a lower end of a crank arm 74 fixed to, and projecting downward from, a rightward end location of the shaft 64 so as to maintain the roller 68 in contact with the cam track of the plate 60.

As is apparent in FIG. 3, oscillatory motion imparted to the twine position control shaft 64, as the roller 68 follows the cam track defined by the cam plate 60 when the knotter gear drive shaft 24 is driven, is transferred to transversely spaced twine position control arms 76 (only the leftmost arm 76 being visible in FIG. 3) joined to, and projecting rearward from equally spaced predefined locations of the shaft 64, with each arm 76 having a twine guide roller 78 at its rearward end.

Figure 4:
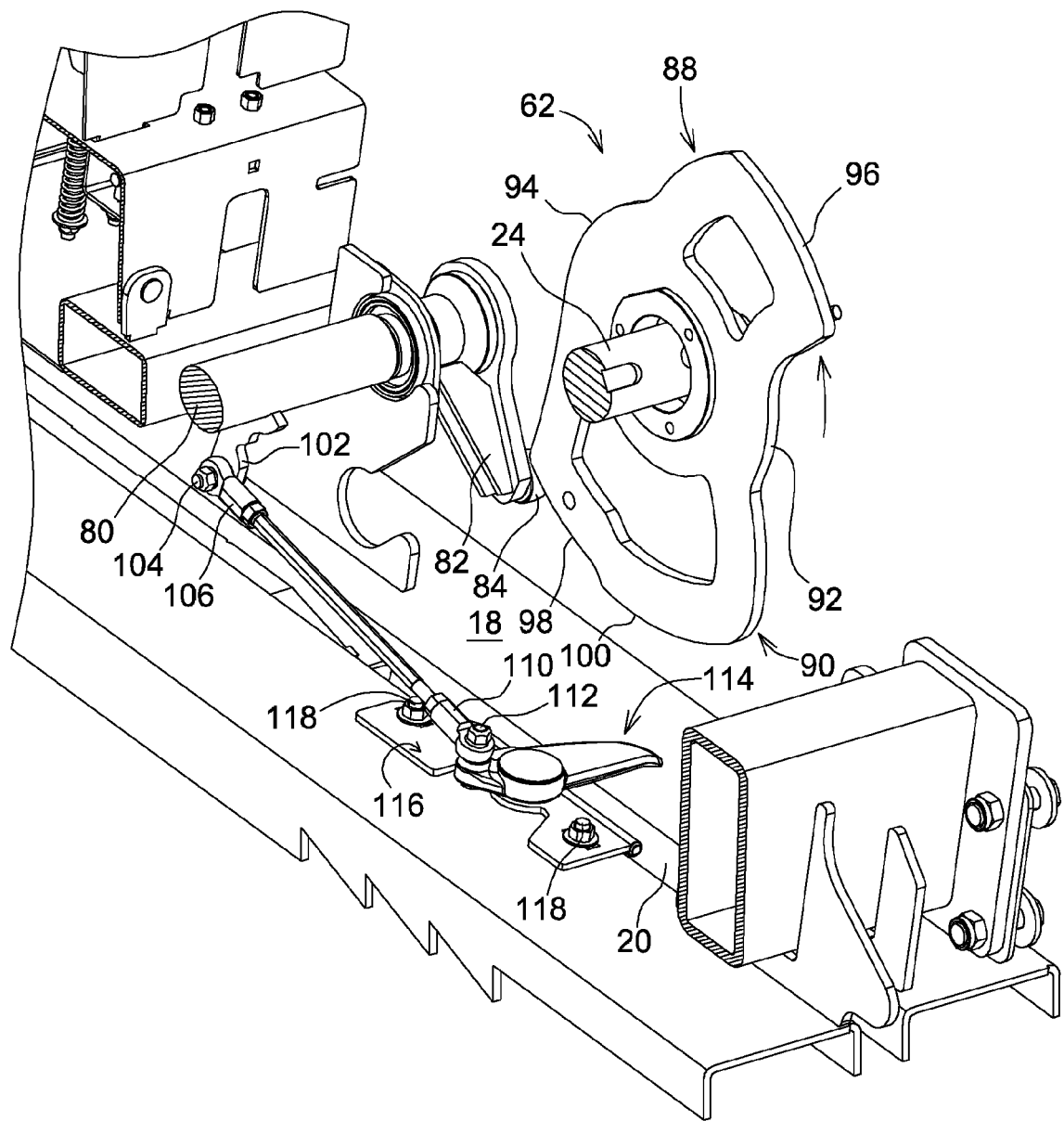
FIG. 4 is a top left rear perspective view showing only one of the tucker finger assemblies and the structure for causing it to be pivoted between a working position wherein it extends across a needle slot, as shown, and a standby position, wherein it extends alongside the needle slot.

A tucker finger control shaft 80 is mounted vertically above the twin position control shaft 64 and, like the shaft 64, has opposite ends rotatably received in bearing carried by bearing support plates (not shown). A cam follower arm 82 (see FIG. 2) is joined to and projects down and to the rear from a right end location of the shaft 80 and carries a follower roller 84 biased into engagement with a cam track, defined by an edge of the cam plate 62, by a coil tension spring 86 tensioned by between an anchor point of the support frame and an arm 87 joined to, and projecting upwardly from, the shaft 80 at a location that is just leftward of the cam plate 62. Referring now also to FIG. 4, it can be seen that the cam plate 62 has a cam track defined by first and second cam lobes 88 and 90, respectively, and by first and second inner arcuate surfaces 92 and 94, respectively, joined to the cam lobes and formed at an inner radius. The first lobe 88 defines a first outer arcuate surface 96, and the second lobe defines a second outer arcuate surface 98 having an end joined to a third outer arcuate surface 100. The first and second outer arcuate surfaces 96 and 98 are located diametrically opposite from each other and each is formed at the same radius. The third outer arcuate surface is formed at a radius slightly greater than that of the first and second outer arcuate surfaces.

When the knotter drive shaft 24 is driven during a tying operation, oscillatory motion is imparted to the tucker finger control shaft 80 as the follower roller 84 follows the cam track defined in serial order by the arcuate surfaces 98, 92, 96, 94 and 100 as the cam plate 62 rotates clockwise, as viewed in FIG. 4, this motion being transferred to a plurality of tucker finger control arms 102 (only the leftmost arm being visible in FIG. 3) joined to, and projecting downward from, predefined locations of the shaft 80. A lower end of each arm 102 carries a horizontal pivot bolt 104 on which is received a ball joint of a front coupling member 106 threaded onto a forward end of a rod forming part of a motion transfer link 108 extending rearward and having a ball joint-containing rear coupling member 110 threaded onto its rear end, with the ball joint being received on an upright coupling bolt 112 located in one end of a substantially horizontal, plate-like tucker finger 114. By changing the amount of screwed engagement of the front and rear coupling members 106 and 110 with the opposite ends of the rod forming part of the motion transfer link 108, the length of the motion transfer link may be adjusted, for a purpose described below.

Figure 5:
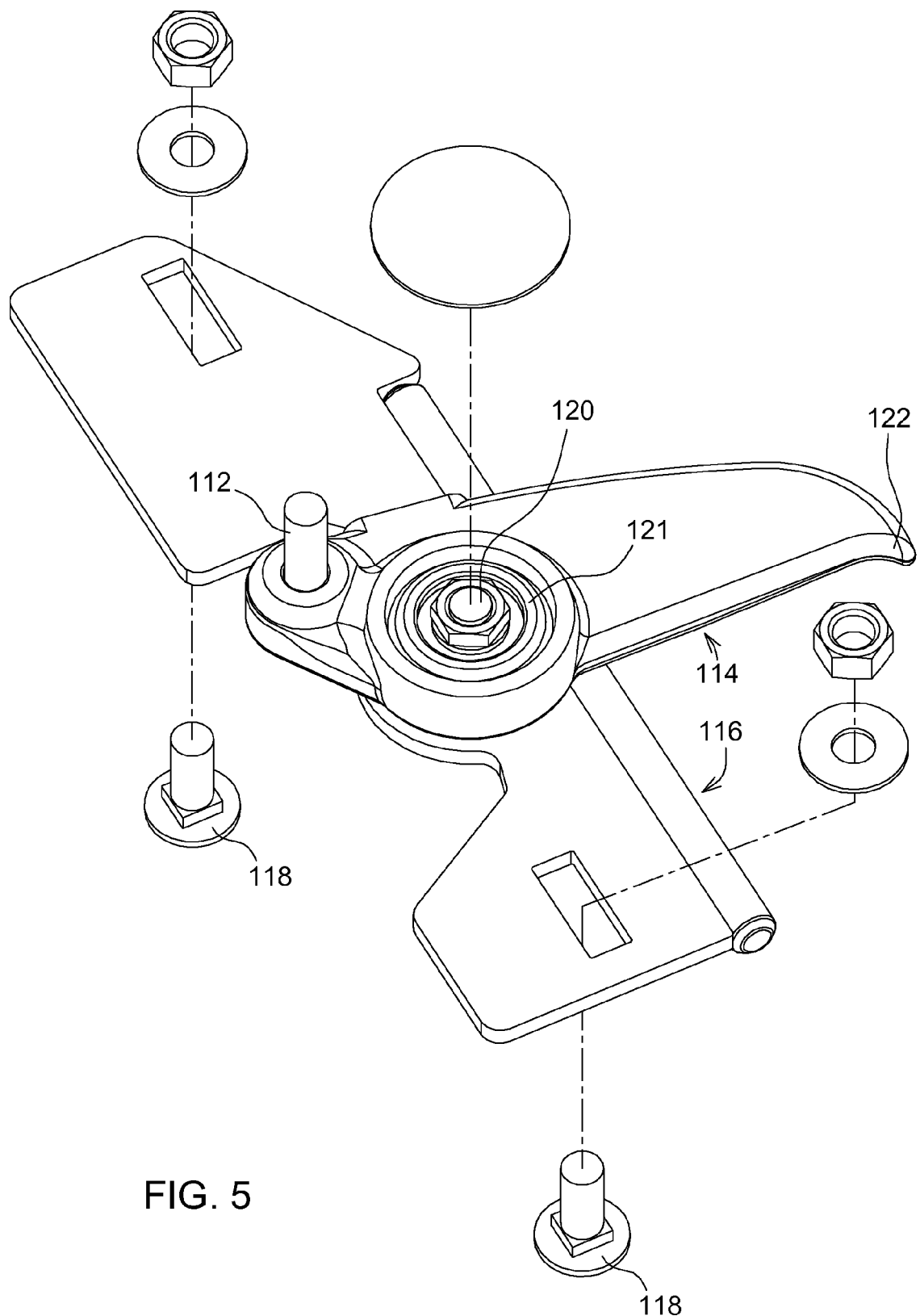
FIG. 5 is an enlarged perspective view of the base plate and tucker finger shown in FIG. 4, but with a dust cap covering an upper end of a machined shaft of the base plate being removed.
Figure 6:
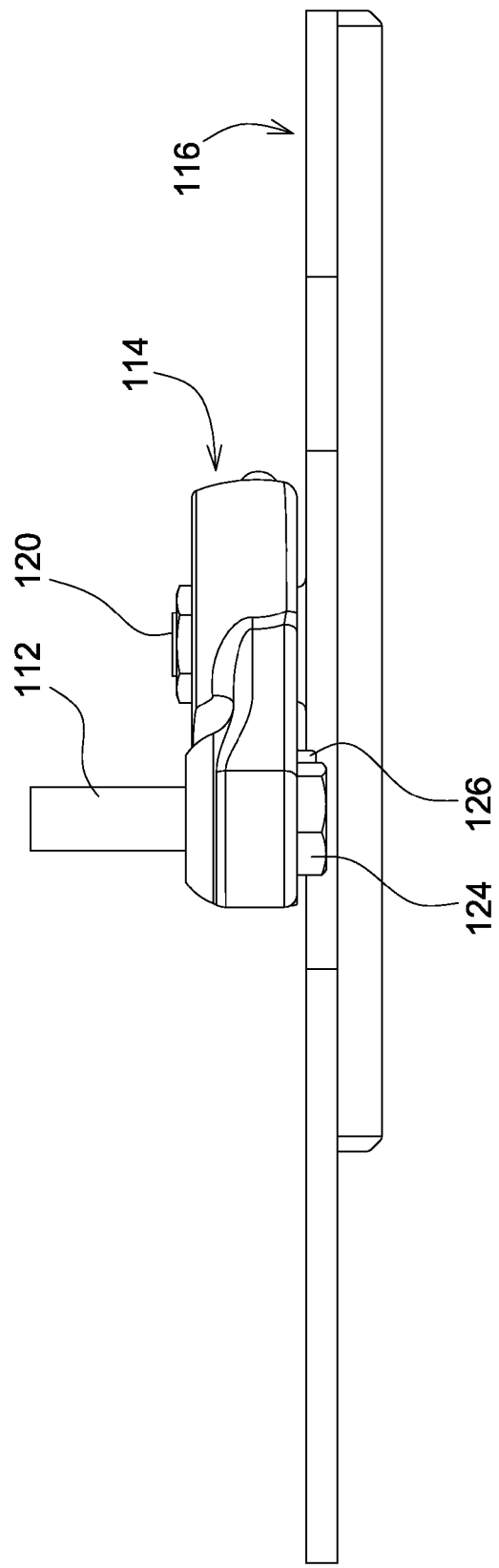
FIG. 6 is a left side view of the base plate and tucker finger shown in FIG. 5.

Referring now also to FIGS. 5-7, it can be seen that a longitudinally extending, generally flat and rectangular base plate 116 is mounted, as by a pair of upright mounting bolts 118, to the bottom or floor 14 of the knotter table support frame 12 at each of a plurality of locations respectively along left sides of the needle slots 20. Welded, or otherwise fixed, to each of the base plates 116 at a location between opposite ends thereof is a vertical or upright machined shaft 120 having a retaining nut screwed onto a threaded upper end thereof, with a respective tucker finger 114 being mounted, by means of a bearing member 121, for pivoting about an upright axis defined by the upright shaft 120 through a desired range of movement between a standby position, wherein the tucker finger 114 is completely leftward of the needle slot 20, and a working position, wherein the tucker finger 114 is crosswise to the slot 20, as shown in FIG. 1, for example. It is here noted that the shaft 120 can be replaced by any suitable upright post member, such as a bolt, for example. The angular distance between the standby and working positions is about 90°.

At the start of a double-knotting cycle, the drive gears 28 of the respective knotter assemblies 26 are simultaneously driven when the knotter gear drive shaft 24 is engaged in response to a bale reaching a completed length within the baling chamber (not shown), with the first knots to be tied being those required to be tied to complete the tying of six loops of twine about the just completed bale. In tying each first knot, the associated tucker finger 114 moves from its standby position to its working position, this movement being brought about by rotation of the cam plate 62 and begins just after the twine-carrying needle (not shown) carries a first strand of twine upwardly behind the completed bale and through the associated needle slot 20 and then engages a second strand, to be knotted with the first strand, and carries the first and second strands of twine upwardly through the knife arm crotch 54, across the bill hook 38 and a notch at the periphery the discs of the twine holder 46, the twine holder operating so as to secure the strands of twine. At the beginning of rotation of the cam plate 62, the cam follower roller 84 is initially engaged with the outer arcuate surface 98, the cam track moving beneath the roller 84 and first bringing the inner arcuate surface 94, and then bringing the outer arcuate surface 96, into engagement with the roller. This movement of the tucker finger 114 causes it to be engaged with the twine strands to aid in positioning them for being engaged by the bill hook 38 which is rotated to knot the strands together with the resulting first knot being held at the top of the crotch 54. As the first knot is being finished, the needle retreats toward its standby position below the bale chamber and at the same time the knife arm 52 is caused to swing transversely and cut the two strands of twine at a location between the first knot and the twine holder 46, noting that the first and second strands of twine are still being held by the twine holder. At this point in time, the outer arcuate cam surface 96 rotates past the follower roller 84 so that the inner arcuate cam surface 94 engages the roller 84 resulting in the tucker finger 114 pivoting back to its standby position alongside the needle slot 20, this movement of the tucker finger freeing the completed first knot. The receding needle carries a twine strand with it and positions this strand within the crotch 54 while a second strand of twine extends between the twine holder 46 and the twine guide roller 78, which now is held at a lower position by the associated twine position control arm 76. By this time, the tucker finger control cam plate 62 has rotated such that the outer arcuate surface 98 once again comes into engagement with the follower roller 84 and causes the tucker finger 114 to be pivoted toward its working position, which is reached when the arcuate outer surface 100 of the cam plate rotates past the roller 84. During this movement, the tucker finger 114 tightly seats the two twine strands in the crotch 54, with the bill hook 38 then being rotated to tie a second knot to form a length of twine draped across a rear face of a new bale being formed. Once this knot is tied, the knife arm 52 is once again cycled to swing transversely and cut the two twine strands extending between the second knot and the twine holder 46. During this time, rotation of the cam plate 62 brings the outer arcuate surface 98 into contact with the follower roller 84 to complete the double-knotting cycle, with the drive then being disconnected from the knotter gear drive shaft 24 so that it and the control cam plates 60 and 62 cease to rotate.

During the manufacturing process or during any service process involving the positioning of the tucker fingers 114, they are each adjusted to their standby position by adjusting the length of the motion transfer link 108 so as to position a hooked end 122 of the tucker finger 114 in the range of 0-3 mm from the adjacent needle slot 20 when the follower roller 84 is engaged with one or the other of the innermost arcuate surfaces 92 and 94 of the tucker finger control cam plate 62. In the event that this adjustment is erroneously made with the follower roller 84 in contact with the cam track of the tucker finger control cam plate 62 at a radius larger than that of the innermost radius at which the surfaces 92 and 94 are formed, the motion imparted to the erroneously set tucker finger 114 by the motion transfer link 108 will tend to drive the link over-center. Even if the position of a given tucker finger 114 is initially correctly set, the jam nuts securing the front and rear coupling members in place may not be fully tightened allowing them to loosen thus permitting the motion transfer link 108 to lengthen to the extent that the associated linkage can be driven over-center by the cam plate 62.

To prevent the link 108 from moving over-center and causing damage to any of the linkage parts coupling the control shaft 80 to the tucker finger 114, the coupling bolt 112, as can be seen in FIGS. 6 and 7, includes a hex head 124 that is positioned below an upper surface of the base plate 116 and is held in a fixed angular orientation relative to the tucker finger 114 by a cast feature 126 of rectangular cross section formed integrally with a bottom side of the tucker finger and extending below the upper surface of the base plate 116, with a straight side of the cast feature 126 engaging a first flat side 128 of the hex head. The hex head 124 and cast feature 126 define stopping elements having a function explained below and since they are located beneath the tucker finger 114, twine strands and/or crop material are prevented from being wrapped around these stopping elements. The base plate 116 has an edge defining a cut-out region 130 on a side opposite from an edge that border the needle slot 20, with the hex head 124 and cast feature 126 being located within the cut-out region 130 which provides clearance for free movement of the head 124 and feature 126 during pivoting operation of the tucker finger 114 about the machined shaft 120. More specifically, the cut-out region 130 is bordered by an inner arcuate edge 132 formed at a radius which is less than the distance of the cast feature 126 from the pivot axis defined by the machine shaft 120, the arcuate edge 132 having opposite first and second ends respectively terminating at first and second stop surfaces 134 and 136. The designed location of the first stop surface 134 is such that, when the tucker finger 114 is in its standby position wherein it is free of, and extends generally parallel to the adjacent needle slot 20, the bolt hex head 124 and cast feature 126 will minimally clear the first stop 134 surface, with the associated knotter assembly 26 being operable to successfully tie a know when the tucker finger is pivoted to its working position to aid in such tying. Thus, the first stop surface 134 is located such that minimal pivoting of the tucker finger 114 beyond its correctly set position when pivoting the tucker finger from its working position to its standby position (clockwise as viewed in FIG. 7), will result in the cast feature 126 and the hex head 124 abutting the first stop surface 134, whereby the operating linkage is prevented from going over center, with the follower roller 84 being caused to separate from the cam plate 62 when the hex head 124 and cast feature 126 bottom out on the stop surface 134. This operation will occur, for example, in the event that the motion transfer link 108 is misadjusted or if one or the other, or both of, the coupling 106 and 110 loosen resulting in an increase in the length of the link 108.

The second stop surface 136 is located such that, when the tucker finger 114 is in a desired set working position wherein it extends approximately perpendicular to the needle slot 20, the bolt hex head 124 and cast feature 126 will be spaced significantly from the second stop surface 136. However, in the event that the motion transfer link 108 is misadjusted resulting in the motion transfer link 108 being a small amount shorter than a desired length setting, the distance between the second stop surface 136 and the head 124 and cast feature 126 is such that this small amount of shortening will result in the tucker finger 114 pivoting counterclockwise (as viewed in FIG. 7) beyond its correctly set working position and in the cast feature 126 and hex head 124 abutting the second stop surface 136 prior to the link 108 going over-center.

It is here noted that instead of the stop surface features being incorporated in the base plate 116, stop elements such as bolts or welded straps protruding upwardly from the bottom wall or floor 14 of the knotter frame 12 into the cut-out region 130 of the base plate could be used. Also, instead of using the head of the bolt 112 that connects the motion transfer link 108 to the tucker finger 114 as the stopping element, the tucker finger base plate 116, or the underlying knotter frame floor 14, could have a stop feature that is located in the path of movement of the tucker finger 114 and comes into contact with the finger profile to prevent the motion transfer link 108 from being driven over-center.

Having described the preferred embodiment, it will become apparent that various modifications can be made without departing from the scope of the invention as defined in the accompanying claims.

The invention claimed is:

1. A tucker finger control assembly, comprising: a tucker finger control shaft mounted for oscillating about a horizontal transverse axis; an elongate tucker finger mounted for pivoting in a desired working range about an upright axis between a standby position and a working position; a fore-and-aft extending, length-adjustable tucker finger motion transfer link extending between, and having opposite ends respectively pivotally coupled to, the tucker finger control shaft and the tucker finger for selectively moving said tucker finger between said standby and working positions; an operating linkage for connecting the tucker finger to the tucker finger motion transfer link; and a hard stop arrangement being provided for engaging one of said motion transfer link and said tucker finger in the event said tucker finger, when being pivoted from said working position to said standby position, is pivoted a predetermined minimal distance beyond said standby position before the operating linkage is driven over-center.

2. The tucker finger control assembly, as defined in claim 1, wherein the operating linkage includes a pivotal connection with the motion transfer link being defined in part by an upright bolt projecting through the tucker finger and having a hex head located below the tucker finger, with said hex head forming part of said hard stop arrangement.

3. The tucker finger control assembly, as defined in claim 2, wherein said tucker finger includes an integral feature that projects downward and engages a flat side of the hex head of the upright bolt so that respective flat sides of the hex head are always oriented in the same way during assembly, with one of the flat sides serving as an abutment surface of said hard stop arrangement.

4. The tucker finger control assembly, as defined in claim 2, wherein said tucker finger is defined in part by a horizontal plate; a horizontal base plate being provided with an upright post member defining said upright axis and pivotally supporting said tucker finger for pivoting about said upright axis; said base plate being provided with a clearance space extending in an arc about said upright axis for providing a clear path of travel for the bolt hex head when motion is imparted to the motion transfer link for pivoting the tucker finger between said standby and working positions; and said clearance space having at least one end bordered by a stop surface located for being engaged by said bolt hex head in the event said tucker finger pivots said minimal distance beyond said desired standby position when moving from said working position to said standby position.

5. The tucker finger control assembly, as defined in claim 4, wherein said post member is a machined shaft welded to said base plate.

6. The tucker finger control assembly, as defined in claim 4, wherein said tucker finger is pivotally mounted to said upright post through means of a bearing.

7. The tucker finger assembly, as defined in claim 2, wherein said tucker finger is defined in part by a horizontal plate; a horizontal support member being provided for pivotally supporting said tucker finger for pivoting about said upright axis; said horizontal support member being provided with a clearance space extending in an arc about said upright axis for providing a clear path of travel for the bolt hex head when the tucker finger motion transfer link is operated for pivoting the tucker finger between said standby and working positions; and said clearance space having opposite ends respectively defined by first and second stop surfaces located for being engaged by the bolt hex head in the event said tucker finger pivots a preselected first distance beyond a desired standby position when moving from said working to said standby position, or pivots a preselected second distance beyond a desired working position when moving from said standby position to said working position.

* * * * *